(12) United States Patent
Patterson et al.

(10) Patent No.: US 8,588,849 B2
(45) Date of Patent: Nov. 19, 2013

(54) SYSTEM AND METHOD FOR RESUMING MEDIA

(75) Inventors: Andrew Robert Patterson, Waterloo (CA); Chad Robert Ford Furniss, Kitchener (CA); Christopher James Runstedler, Cambridge (CA)

(73) Assignee: BlackBerry Limited, Waterloo (CA)

( * ) Notice: Subject to any disclaimer, the term of this patent is extended or adjusted under 35 U.S.C. 154(b) by 278 days.

(21) Appl. No.: 12/833,520

(22) Filed: Jul. 9, 2010

(65) Prior Publication Data
US 2012/0009906 A1      Jan. 12, 2012

(51) Int. Cl.
*H04B 1/38* (2006.01)
(52) U.S. Cl.
USPC ............. 455/557; 455/575.6; 455/569.1; 455/556.1; 381/380; 709/204
(58) Field of Classification Search
None
See application file for complete search history.

(56) References Cited

U.S. PATENT DOCUMENTS

| | | | |
|---|---|---|---|
| 2002/0013784 A1* | 1/2002 | Swanson | 707/104.1 |
| 2006/0230908 A1* | 10/2006 | Lee et al. | 84/609 |
| 2007/0142942 A1* | 6/2007 | Hyatt | 700/94 |
| 2008/0082936 A1* | 4/2008 | Helvick | 715/779 |
| 2008/0084981 A1* | 4/2008 | Lee et al. | 379/201.01 |
| 2008/0200154 A1 | 8/2008 | Maharajh | |
| 2009/0232481 A1 | 9/2009 | Baalbergen | |
| 2010/0069114 A1* | 3/2010 | Lee et al. | 455/556.1 |
| 2012/0045083 A1* | 2/2012 | Lin | 381/380 |

FOREIGN PATENT DOCUMENTS

WO      2006103602 A1      10/2006

OTHER PUBLICATIONS

Windows Media Player; Windows Mobile Tips; Turn your smartphone into a multimedia powerhouse. vol. 7 issue 2; published on Feb. 2009 and retrieved on Jun. 27, 2012. http://pctoday.com/editorial/article.asp?article=articles%2f2009%ft0702%2f13t02.

* cited by examiner

*Primary Examiner* — Rafael Pérez-Gutiérrez
*Assistant Examiner* — Keith Fang
(74) *Attorney, Agent, or Firm* — Novak Druce Connolly Bove + Quigg LLP (57) ABSTRACT

A system and method of resuming media playback on a mobile device can include playing media on a mobile device and outputting audio associated with the playing media to an audio output device. The media can be paused in response to receiving an interrupt request. A play request can be received to resume playing of the media on the mobile device. A determination can be made as to whether the audio output device is communicatively coupled to the mobile device. The media can resume play in response to the audio output device being communicatively coupled to the mobile device. In another implementation, media can resume play if a determination is made that the audio output device outputting the audio associated with the media before the interrupt request is the same audio output device that will output audio associated with the media after the interrupt request.

20 Claims, 6 Drawing Sheets

SYSTEM AND METHOD FOR RESUMING MEDIA

FIELD

This disclosure, in a broad sense, is directed toward a system and method for resuming media. More specifically, this disclosure relates to media playback on a mobile device.

BACKGROUND

With the advent of more robust electronic systems, advancements of mobile devices are becoming more prevalent. Mobile devices can provide a variety of functions including, for example, telephonic, audio/video, and gaming functions. Mobile devices can include mobile stations such as cellular telephones, smart telephones, portable gaming systems, portable audio and video players, electronic writing or typing tablets, handheld messaging devices, personal digital assistants, and handheld computers.

Mobile devices allow users to have an integrated device which can perform a variety of different tasks. For example, a mobile device can be enabled for each of or some of the following functions: voice transmission (cell phones), text transmission (pagers and PDAs), sending and receiving data for viewing of Internet websites, multi-media messages, videography and photography. Additionally, mobile devices can include one or more media applications which enable playback of a media file. When enabled for media playback, the user can listen to music, watch videos, watch animation, and the like.

BRIEF DESCRIPTION OF THE DRAWINGS

Implementations of the present application will now be described, by way of example only, with reference to the attached figures, wherein.

DETAILED DESCRIPTION

As will be appreciated for simplicity and clarity of illustration, where appropriate, reference numerals have been repeated among the different figures to indicate corresponding or analogous elements. In addition, numerous specific details are set forth in order to provide a thorough understanding of the implementations described herein. However, those of ordinary skill in the art will understand that the implementations described herein can be practiced without these specific details. In other instances, methods, procedures and components have not been described in detail so as not to obscure the related relevant feature being described. Also, the description is not to be considered as limiting the scope of the implementations described herein.

Several definitions that apply throughout this disclosure will now be presented. The word "coupled" is defined as connected, whether directly or indirectly through intervening components and is not necessarily limited to physical connections. The term "communicatively coupled" is defined as connected whether directly or indirectly though intervening components, is not necessarily limited to a physical connection, and allows for the transfer of data. The term "mobile device" is defined as any electronic device that is capable of at least accepting information entries from a user and includes the device's own power source. A "wireless communication" means communication that occurs without wires using electromagnetic radiation. The term "media" is defined as visual, audio, or combined visual and audio data which can be outputted by a mobile device. For example, media can include video files, audio tracks, music files, songs, movies, animations, graphics, MIDI files, or any other media file which can be played or outputted by a mobile device. The term "uncouple" refers to decoupling, unplugging, removing, disengaging, or otherwise disconnecting one object from another object. The term "audio sink" refers to the hardware through which audio is being transferred. For example, audio sinks can include handset speakers, portable speakers, headsets, headphones, earphones, Bluetooth devices, or the like.

Mobile devices enabled for media playback allow the user of the mobile device to watch videos, listen to music, watch and listen to streamed media, listen to a radio station, watch movies, watch animations, play video games, and the like. In some instances, interruptions can disrupt the playback of the media, which can cause user frustration. For example, an incoming call can interrupt a user watching a video on the mobile device. The interruption prevents continued viewing of the video.

The present disclosure provides a method and apparatus for media playback on a mobile device. The playback of media on the mobile device can be paused in response to receiving an interrupt request. The interrupt request can be based upon a user initiated interrupt request or upon a device initiated interrupt request. According to the present disclosure as will be described more fully below, the mobile device can resume playback of the previously playing media in response to receipt of a play request. In response to the play request, a determination is made as to whether the audio output device is communicatively coupled to the mobile device. If the audio output device is communicatively coupled to the mobile device, the media on the mobile device can resume play. If the audio output device is not communicatively coupled to the mobile device, the media on the mobile device can remain paused or playback can be canceled. Other configurations and arrangements will be described below in relation to illustrated implementations. One of ordinary skill in the art would appreciate that the elements from the illustrated implementations of the system and method of resuming media playback can be optionally included and arranged in various combinations to achieve the described benefits of the presently disclosed method and apparatus for resuming media playback.

Figure 1:
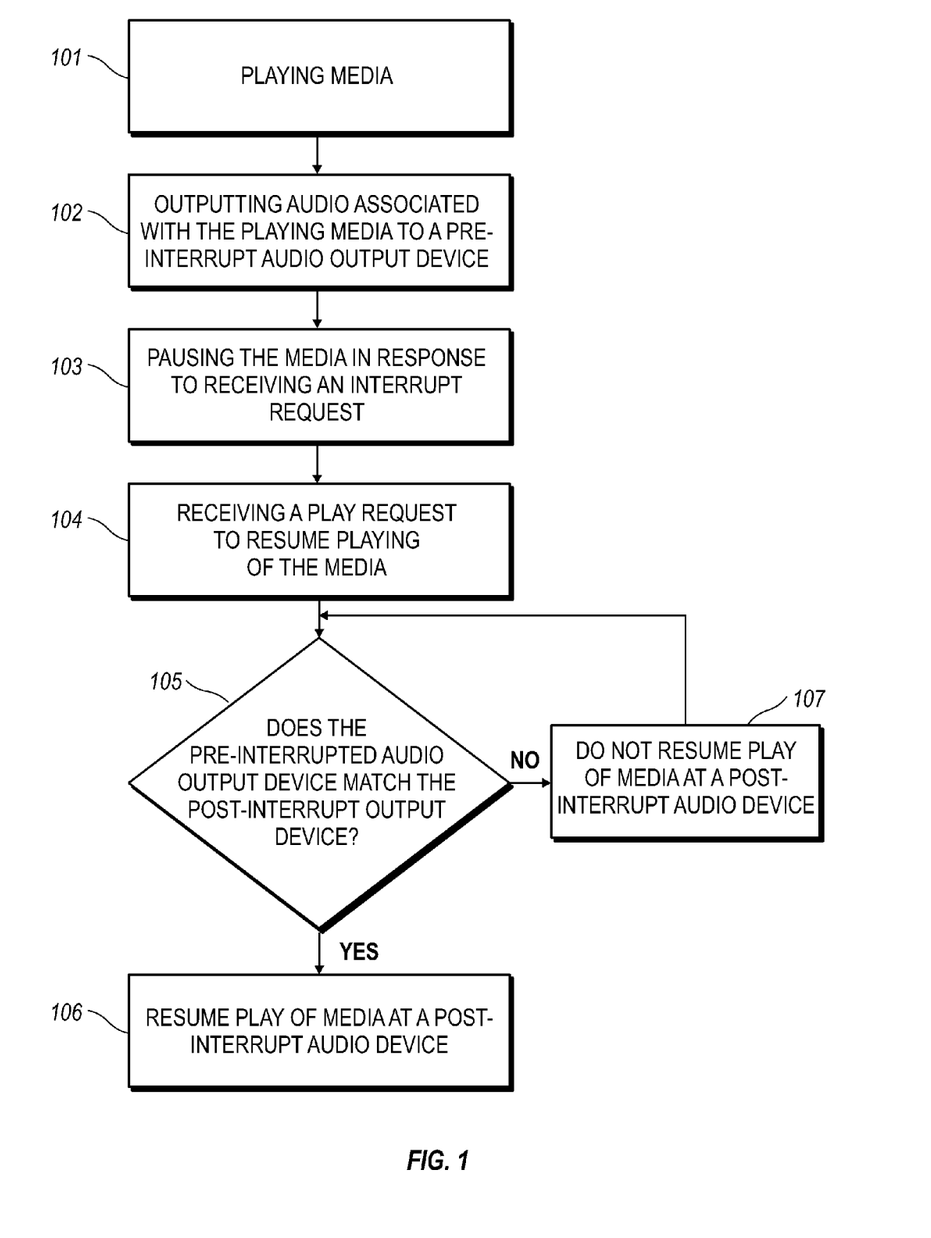
FIG. 1 is a flow diagram of resuming media playback in accordance with an exemplary implementation of the present disclosure.

FIG. 1 is a flow diagram of a method for resuming media playback in accordance with an exemplary implementation of the present disclosure. The method includes playing media (block 101) on a mobile device and outputting audio (block 102) associated with the playing media to an audio output device coupled to the mobile device. For example, in an exemplary implementation, the media can be a music track, and the audio associated with the music track can be output to an audio output device such as a set of audio headphones. Other examples of audio output devices also include handset speakers, portable speakers, headsets, headphones, earphones, Bluetooth devices, or the like.

When an interrupt request is received, the method includes pausing the media (block 103) in response to the interrupt request. The interrupt request indicates that another application has information for a user. The information for the user can be in the form of a telephone call, a meeting reminder, text message, instant message, email message or the like. In some implementations, the ability of the particular application to interrupt media playback can be user defined so that the user can set which applications can interrupt media playback. In other implementations, the applications that can interrupt media applications will be set by a manufacturer or at an enterprise level. Once the interrupt request is received, the media playback can be paused thereby allowing the user the ability to return to the media playback and resume playback from the current position. In other implementations, a pop-up window can be displayed to provide options in regards to the interrupt request, as well as the media playback. In the implementation with a pop-up window, the user is afforded more flexibility thereby allowing the user to select whether to continue playback or accept the interrupt request. Additionally, the mobile device 100 can include the ability to switch applications.

One example of the interrupt request includes a detection of an incoming telephone call. In at least one implementation, pausing the media can occur automatically in response to the mobile device receiving the telephone call. Alternatively, a pop-up window can be displayed on the display screen which can indicate the receipt of an incoming call and provide the user with user-selectable options to accept the call and pause the playing media or to ignore the call and close the pop-up window. In other implementations, the interrupt request can be a user-selection of an option, a user-request to switch applications running on the mobile device, a user-selection of a video recorder application or a camera application, detection of the media screen being removed from the foreground of the display screen, a detection of an incoming email, SMS text message, or an instant message, or any other similar interrupt request. In at least one implementation, the interrupt request can be received at a processor, and the processor can be configured to pause the playing of the media.

The method can also include receiving a play request to resume playing of the media, as illustrated in block 104 of FIG. 1. In at least one implementation, a play request can be made automatically in response to the detection of the termination of an interrupt request. For example, a play request can be made automatically in response to the termination of a telephone call. Alternatively, the play request can be a closing of an email application, a closing of an instant messaging application, a detection of the media being brought to the foreground of the display screen, a user-selection to resume playback of the media, a user-selection to ignore an incoming telephone call or message, an instruction to resume playing media, or any other similar play request.

In response to receiving a play request, the method of resuming media playback can include determining (block 105) whether the audio output device is communicatively coupled to the mobile device. If the audio output device is communicatively coupled to the mobile device, playing of the media resumes (block 106). As indicated above, once the interrupt request has terminated, the media playback can resume automatically if the audio output device is communicatively coupled to the device. However, if the audio output device is not communicatively coupled to the mobile device, resuming playing of the media does not occur (block 107), and the media can remain paused. In at least one implementation, the play request and determination of whether the audio output device is communicatively coupled to the mobile device can be received at and executed by a processor communicatively coupled to the mobile device. Additionally, if the audio output device is not communicatively coupled a determination can be made whether another audio output device having similar properties is communicatively coupled to the mobile device. Furthermore, a prompt can be displayed indicating that media playback will resume upon detection of the same audio output device.

In at least one implementation, resuming playing of media can occur if the audio output device used to output the audio associated with the playing media is still communicatively coupled to the mobile device after the interrupt request. In other words, playing media will resume if the audio associated with the playing media will be output to the same audio output device before and after the interrupt request. For example, in one exemplary implementation where the audio associated with the playing media is output to a stereo headset and the playing media is interrupted by an incoming telephone call, if the telephone call is answered using the stereo headset and remains communicatively coupled to the device, the device will automatically resume playing of the media when the telephone call is terminated. As the termination of the telephone call is the play request, and the audio output device did not change from before and after the interrupt request, playing of media automatically resumes upon termination of the telephone call.

In effect, the method for resuming media playback compares the audio output device, from which audio associated with the playing media will be output before and after an interrupt request. If the audio output devices before and after the interrupt request are different, the paused media will not resume playback. For example, the comparison of the audio output devices can result in the audio output device being a stereo headset before the interrupt request, and the audio output device being a speakerphone after the interrupt request; in response, the device will not resume playback of the media. Alternatively, if a comparison of the audio output devices results in a determination that the audio output device that had been coupled to the mobile device before the interrupt request has been uncoupled from the mobile device after the interrupt request, the paused media will not resume playback.

In one exemplary implementation, the determination of whether the audio output device is communicatively coupled to the mobile device can be made upon a detection and comparison of an identifier associated with the audio output device. For example, the audio output device can be associated with a unique identifier such as an RFID tag, a bar code, an electronic identification number, or the like. When the audio output device is communicatively coupled to the mobile device, the mobile device or a processor of the mobile device can detect the unique identifier of the audio output device and identify the particular audio input device that is communicatively coupled to the mobile device before the interrupt request and after the interrupt request. If the mobile device detects a unique identifier after the interrupt request that is different from the unique identifier detected before the interrupt request, resuming playback of media does not occur.

Alternatively, the audio output device can be identified by the byte allocation for the audio output device. The byte allocation can be an allocation of the memory of the mobile device to the audio output device. As the byte allocation can be unique to each audio output device, the mobile device can detect and identify the audio output device based on the byte allocation. Therefore, if the byte allocation (and consequently the audio output device) detected before the interrupt request is different from the byte allocation detected after the interrupt request, resuming playing of the media will not occur. In at least one implementation, the byte allocation is determined based upon data transmitted from the audio output device to the mobile device. The byte allocation can identify a class of products or a particular product. For example, in one implementation, the byte allocation can be used to identify a particular model of headphones produced by a manufacturer. In another implementation, the byte allocation can identify a particular audio output device much like a serial number.

Illustrative examples of the system and method for resuming media playback contemplated by the present disclosure will now be described with reference to FIGS. 2-6.

Figure 2:
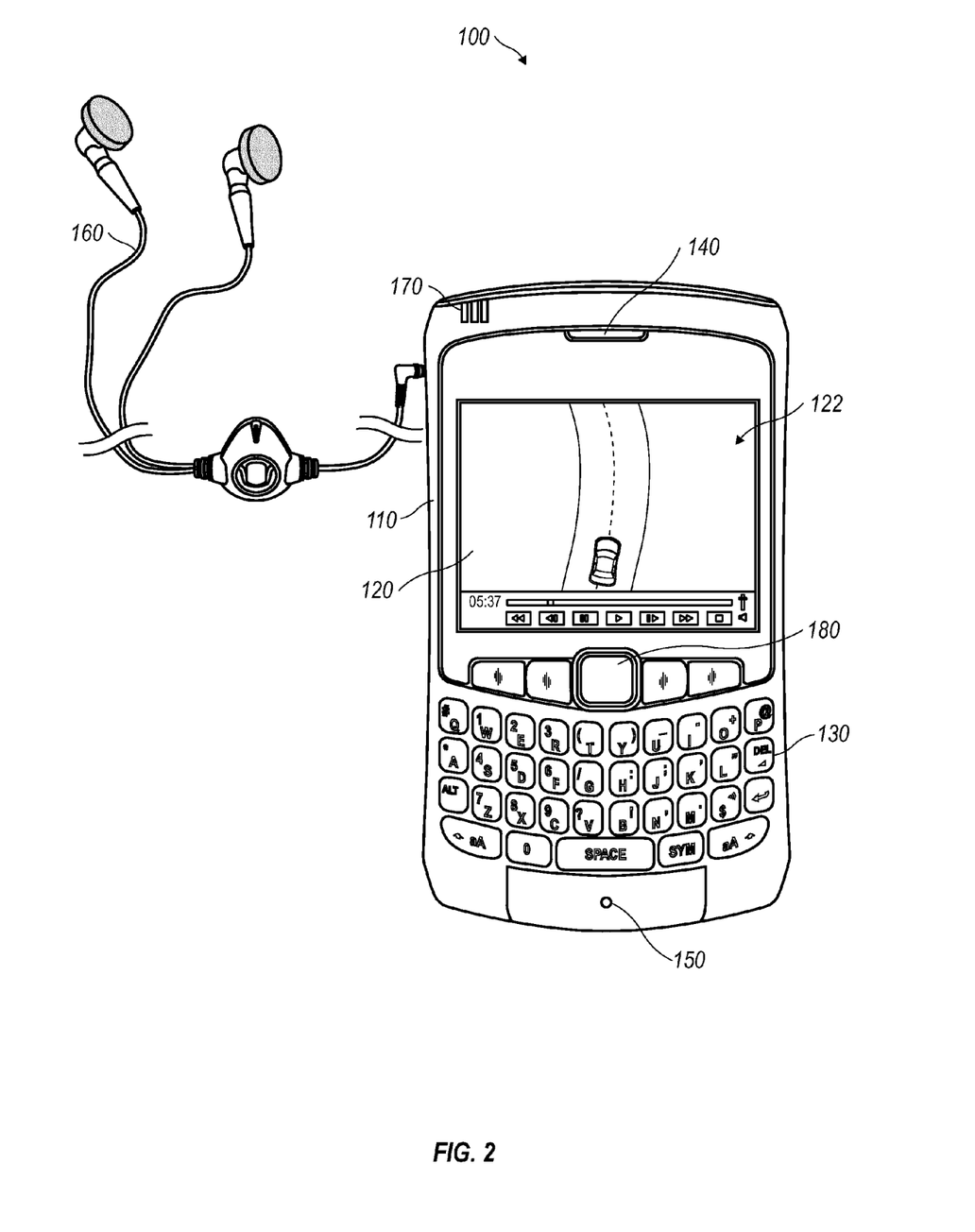
FIG. 2 is an exemplary mobile device playing media thereon and an audio output device coupled to the mobile device in accordance with an exemplary implementation of the present disclosure.

FIG. 2 illustrates a mobile device 100 enabled to playback media 122 on a display 120 of the mobile device 100. The mobile device 100 includes a housing 110 having a speaker 140, a display 120, a keyboard 130, and a microphone 150. The speaker 140 can output audio associated with voice transmissions. The display 120 can be a liquid crystal display (LCD), a light emitting diode (LED) display, an organic light emitting diode (OLED) screen, a touch screen display, or any other display screen on which media can be viewed and graphical objects can be displayed. The keyboard 130 can be a physical keyboard (as illustrated in FIG. 2) having push-button type keys, a touch-sensitive keyboard, a virtual keyboard displayed on the display 120, a capacitive keyboard, or any other keyboard by which data can be input to a processing module of the mobile device 100. The microphone 150 can receive voice transmission and sound for voice communications. In the particular implementation illustrated in FIG. 2, the display 120 is positioned between the speaker 140 and the keyboard 130. Below the keyboard 130 is the microphone 150. The mobile device 100 can also include a navigation tool 180, as illustrated in FIG. 2. In the illustrated implementation, the navigation tool 180 is a trackpad navigation tool and is positioned between the display 120 and the keyboard 130. While the illustrated implementation shows a navigation tool 180 that is a trackpad, the navigation tool can also be a trackball, a jogball, an optical trackball, a joystick, an omni-directional tool, or the like. Additionally, the mobile device 100 can include a speakerphone 170. The speaker phone 170 can be equipped with both loudspeaker and microphone, thereby permitting operation of the mobile device 100 for voice communication or audio outputting without having to hold the mobile device 100.

In FIG. 2, an audio output device 160 is coupled to the mobile device 100. The audio output device 160 illustrated is a pair of ear phones but can also be a stereo headset, a wireless headset, portable speakers, mini speakers, a Bluetooth device, or any other audio sink enabled to output audio from the mobile device 100. While the implementation of FIG. 2 contemplates outputting audio associated with media playing on the device 100 to a pair of ear phones, one of ordinary skill in the art will appreciate that the audio associated with media playing on the device 100 can also be output to the speakerphone 170 or the speaker 140.

FIG. 2 illustrates a media 122 that is a video playing on the display 120 of the mobile device 100. As illustrated in FIG. 2, the video is played in a full-screen mode on the display 120; however, the video 122 can be displayed on less than the full screen of the display 120. Additionally, in FIG. 2, the user can watch the video on the mobile device 100 and listen to the dialogue, soundtrack, and other audio associated with the movie through the earphones 160 without disturbing others within the user's vicinity. Alternatively, the user can listen to the audio associated with the movie playing on the mobile device 100 through the speakerphone 170. In other implementations, the media 122 can be an audio track, a movie, a music video, an AM/FM transmitter radio, or the like. For example, if the media 122 is an audio track, a graphic associated with the audio track, such as an album cover, can be displayed on the display 120 along with user-selectable options associated with the audio track, such as a repeat option, a next song option, a stop option, a volume control option, or the like.

Figure 3:
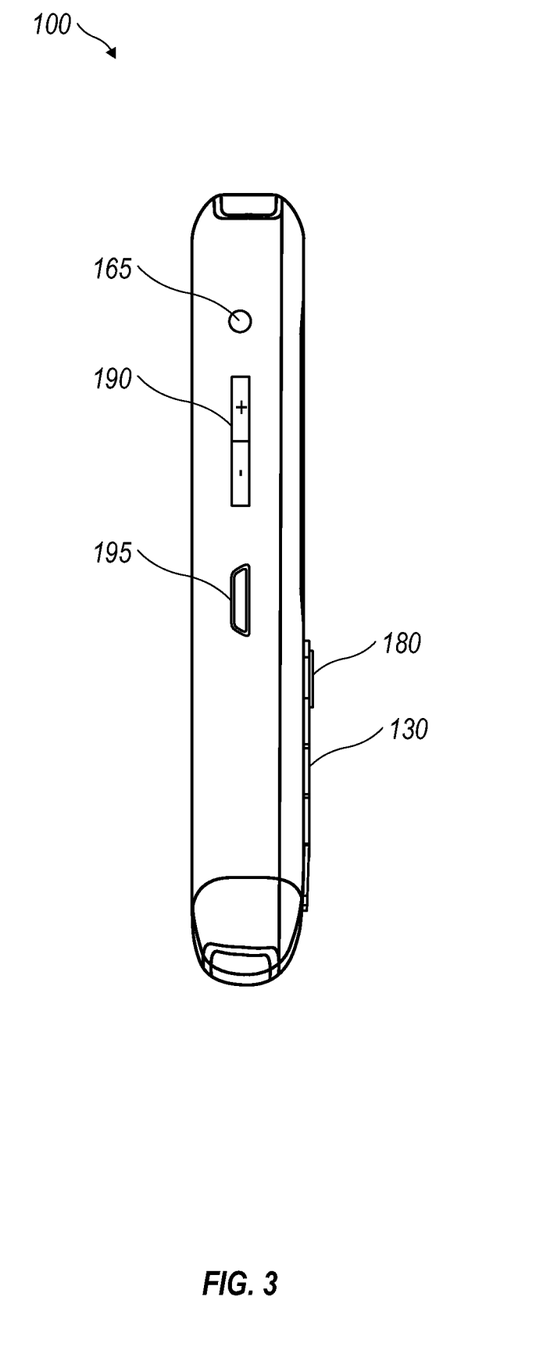
FIG. 3 is a side view of the exemplary mobile device illustrated in FIG. 2 with the audio output device uncoupled from the mobile device.

FIG. 3 is a side view of the mobile device 100 illustrated in FIG. 2 with the audio output device 160 uncoupled from the mobile device 100. As illustrated in FIG. 3, the mobile device 100 includes an audio output port 165 for communicatively coupling the mobile device 100 with an audio output device, such as the earphones 160 illustrated in FIG. 2. Alternatively, the audio output port 165 can be a wireless transmitter for communicatively coupling a wireless headset, a Bluetooth headset, wireless speakers, or any other wireless audio output device to the mobile device 100. In at least one implementation, the audio output port 165 can be communicatively coupled to a processor module (not shown) of the mobile device 100. The processor module can be configured to execute the method of resuming media playback contemplated by the present disclosure. Further details regarding the processor module will be described below.

Additionally, the side of the mobile device 100 can also include function buttons 190. In FIG. 3, the function buttons 190 are volume keys; however, one of ordinary skill in the art will appreciate that the function buttons 190 can be a track-wheel, scrolling buttons, a power button, a camera actuator, a mute button, or any other function button. The mobile device 100 can also include a serial port 195 for communicatively coupling additional components to the mobile device. In FIG. 3, the serial port 195 is a battery charger port for communicatively coupling a charger to the mobile device 100. In other implementations, the serial port 195 can be a USB port, a media card slot, or any other serial port.

Figure 4:
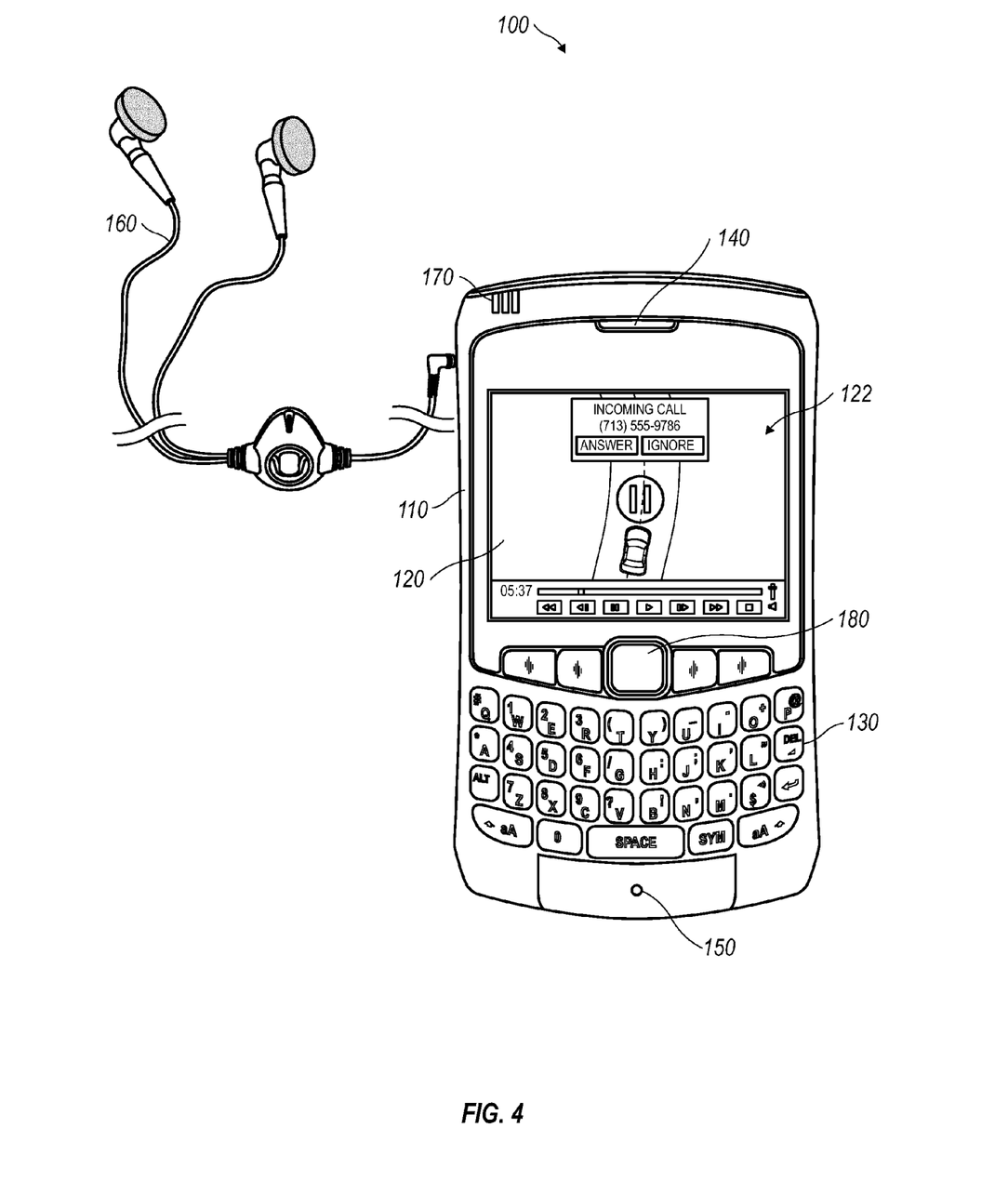
FIG. 4 is the exemplary mobile device illustrated in FIG. 2 in which the playing media is interrupted in accordance with an exemplary implementation of the present disclosure.

FIG. 4 is an illustration of the mobile device 100 depicted in FIG. 2 receiving an interrupt request. In accordance with the present disclosure, when the interrupt request is received, the mobile device 100 pauses the playing media 122. A processor module can be communicatively coupled to the audio output port (not shown) and configured to receive executable instructions to play media on the mobile device 100, output audio to the audio output device 160, pause the media 122 on the mobile device 100 in response to receiving an interrupt request 124, receive a play request to resume playing of the media 122 on the mobile device 100, determine whether the audio output device 160 is communicatively coupled to the mobile device 100, and resume playing the media 122 on the mobile device 100 in response to the audio output device 160 being communicatively coupled to the mobile device 100.

In the particular implementation illustrated in FIG. 4, the interrupt request is an incoming call and is presented as a pop-up window 124. In FIG. 4, the pop-up window 124 displays the telephone number of the incoming call and user-selectable options to answer or ignore the call. In other implementations, the pop-up window 124 can also display the name associated with the telephone number of the incoming call and other user-selectable options, such as a Send-to- Voicemail option. In response to the incoming call (i.e., the interrupt request), the processor module (not shown) of the mobile device 100 can pause the playing media 122. In at least one implementation, the interrupt request can include an interrupt code that the processor processes to determine whether or not to pause the media. For example, the interrupt request can include a "device unavailable" code to indicate that the media should be paused. In FIG. 4, the mobile device 100 has paused the playing media 122, illustrated as a movie, in response to the pop-up window 124 indicating an incoming telephone call has been detected. While the illustrated implementation in FIG. 4 shows a pop-up window 124 that is over laid on a portion of the display 120 and covering a portion of the playing movie 122, one of ordinary skill in the art will appreciate that the pop-up window 124 can cover more than a portion of the display 120, can cover the entire display 120, can send the playing movie to a background of the mobile device 100, can be a transparent pop-up window covering the playing movie 122, or the like. While the playing movie 122 is paused, audio associated with the playing movie 122 is no longer outputted to the audio output device 160. Additionally, while the playing movie 122 is paused, the user can answer or ignore the incoming telephone call.

Figure 5:
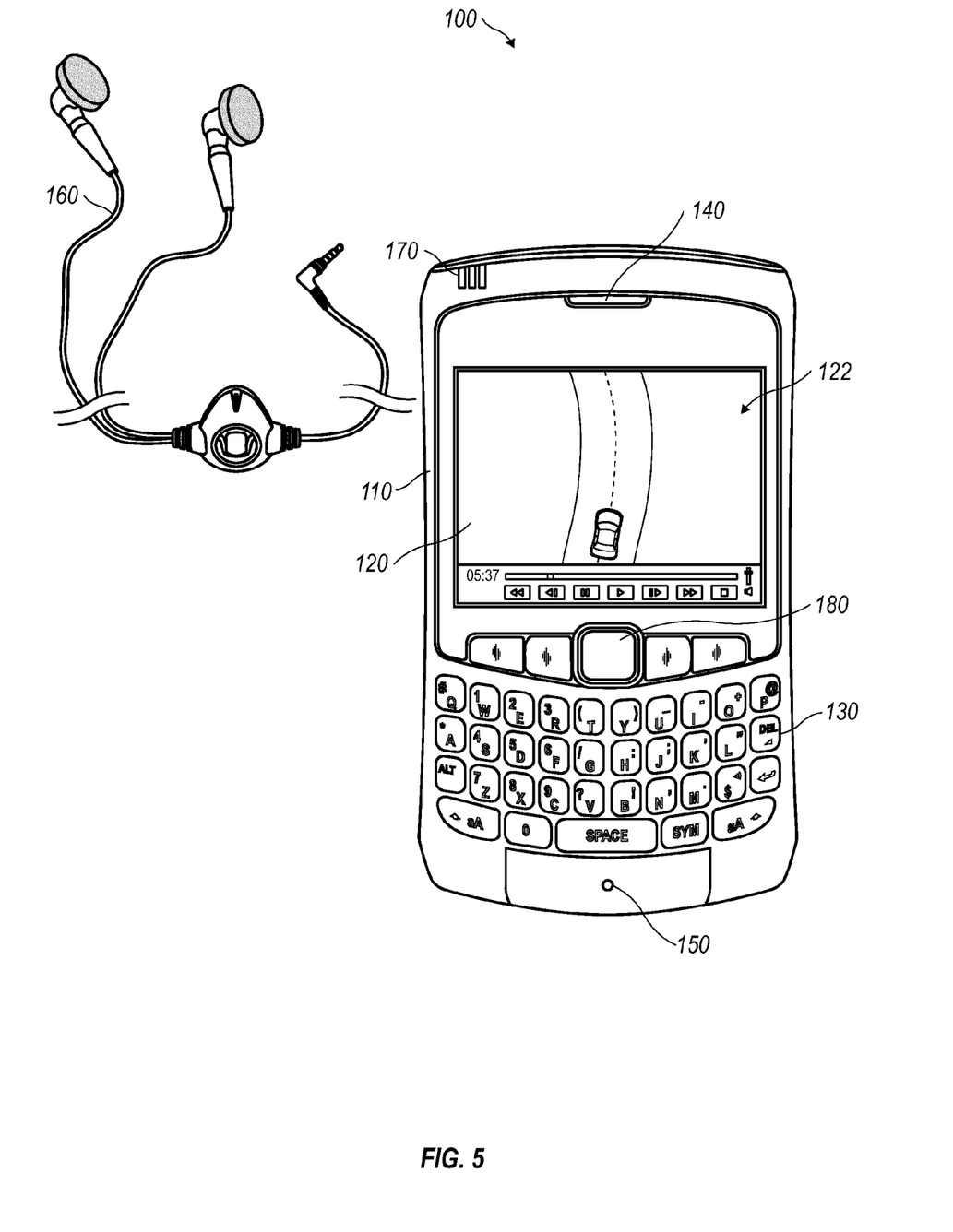
FIG. 5 is the exemplary mobile device illustrated in FIG. 2 in which the audio output device has been uncoupled from the mobile device.

In FIG. 5, the user has answered and completed the incoming telephone call while the playing movie 122 was paused. Additionally, in FIG. 5, the audio output device 160 was uncoupled from the mobile device 100 during the interrupt request to allow the user to answer the incoming telephone call using the speaker phone 170 or the speaker 140 and microphone 150. When the mobile device 100 detects the termination of the interrupt request such as the termination of the telephone call, a play request can be received by the processor module. The play request is a request to resume playing of the media 122 on the mobile device 100; however, the processor module determines whether the audio output device 160 that had been outputting the audio associated with the playing media 122 is communicatively coupled to the mobile device 100. If the audio output device 160 that had been outputting the audio associated with the playing media 122 is communicatively coupled to the mobile device 100 after the interrupt request, the processor module resumes playing the media 122 on the mobile device 100.

In at least one implementation, when a play request is received, the processor module can determine whether a code indicates the audio output device 160 is communicatively coupled to the mobile device 100. For example, the processor module can detect a "device unavailable code" or a "device available code." If the processor module detects a "device unavailable code," the processor module determines the audio output device 160 is not communicatively coupled to the mobile device 100, and the media 122 remains paused. Alternatively, if the processor module detects a "device available code," the processor module determines the audio output device 160 is communicatively coupled to the mobile device 100 and resumes playback of the playing media 122.

In the illustrated implementation of FIG. 5, the audio output device 160 that had been outputting the audio associated the playing media 122 was uncoupled from the mobile device 100 during the interrupt request and remained uncoupled after the termination of the interrupt request. As the audio output device 160 is not communicatively coupled to the mobile device 100, resuming play of the media 122 does not occur. As a result, audio associated with the media 122 will not be inadvertently output upon termination of the telephone call illustrated in FIG. 5. In some instance, the audio associated with media 122 has a volume louder than audio associated with voice transmissions. Thus, in FIG. 5, inadvertent output of audio associated with media is prevented and an user can be assured that others in the user's vicinity will not be disturbed by inadvertent audio output through the speaker phone 170 or another audio output device different from the audio output device used before the interrupt request.

In at least one implementation, the processor module 610 (shown in FIG. 6) can be programmed to execute instructions according to an active media framework. Active media framework allows a particular running application to control the device output. For example, when two different programs are running on the device, one can be made active and given control over at least the audio output port. Thus, the processor module controls the output to the connected audio output device based upon which audio output device is currently active. For instance, if a headset is communicatively coupled to the mobile device 100, the audio is output to the headset. For example, the mobile device 100 can be enabled with a phone-mode and a push-to-talk mode. The active media framework would allow interruption of the media player application by phone-mode application and transfer control of the output device to the phone-mode application from the media player application. Upon control being transferred back to the media player application, a determination can be made whether a device available code is received, thereby indicating the output device which was previously connected is available. If a device unavailable code is detected, the media player application can pause or otherwise control the media playback as described above.

In monitoring the active media framework and the current active audio output device, a notification, such as a "device unavailable" or a "device available," can be sent from the processor module to a controller of the media player application controlling the playback of the media. When the controller receives a "device unavailable" notification or code, the controller instructs the media player to pause the playing media, or otherwise control the playback of the media file as described herein. When an interrupt request is terminated and the processor module determines the audio output device is communicatively coupled to the device, the processor module can send a "device available" notification to the controller of the media player. In response, the media player can resume playback of the media, as described herein.

While the implementations illustrated in FIGS. 2-5 are related to media that is a movie and an interrupt request that is an incoming telephone call, one of ordinary skill in the art will appreciate that the media can be an MP3 file, a music video file, audio played from an AM/FM transmitter or the like. Additionally, one of ordinary skill in the art will appreciate that the interrupt request can be a notification of a new email or text message, a notification of an incoming instant message, a user-selection of a camera application, a user-selection to display a home screen, a user-selection to send the media to a background, or the like.

For example, in an alternative implementation of the system and method for resuming media playback, the media can be an MP3 file having an associated graphic of a record album that is displayed on the display of the mobile device when the MP3 file is played. A wireless headset can be communicatively coupled to the mobile device, and the audio associated with the MP3 file can be output to the wireless headset. As the MP3 file is played, an interrupt request that is a user-selection of a camera application is received by the processor of the mobile device. User-selection of a camera application can be a request to activate the camera of the mobile device to record a video. In response to the user-selection of the camera application (i.e., the interrupt request), the processor pauses the playback of the MP3 file. While the MP3 file is paused, the user can uncouple the headset from the mobile device and be assured that the audio associated with the MP3 file will not be outputted and inadvertently recorded by the camera of the mobile device as the user records a video. When the user finishes recording a video using the mobile device, the user can re-couple the wireless headset to the mobile device and close the camera application or bring the media application to the foreground of the display of the mobile device. The termination of the camera application and returning the application to the foreground of the display can be the play request received by the processor module indicating a request to resume playing of the MP3 file. The processor module can then determine that the wireless headset (i.e., the audio output device) that had been outputting the audio associated with the MP3 file is communicatively coupled to the mobile device after the interrupt request. In response to the determination that the audio out device used to output audio associated with the MP3 file before the interrupt request is the same as the audio output device used after the interrupt request, the processor module can resume play of the MP3 file. In such an implementation, the process module automatically resumes play of the MP3 file in response to the determination that the audio output device that output audio associated with the MP3 file before the interrupt request is still communicatively coupled to the mobile device. Thus, the user need not enter extra inputs or press extra buttons to resume playback of the media.

Figure 6:
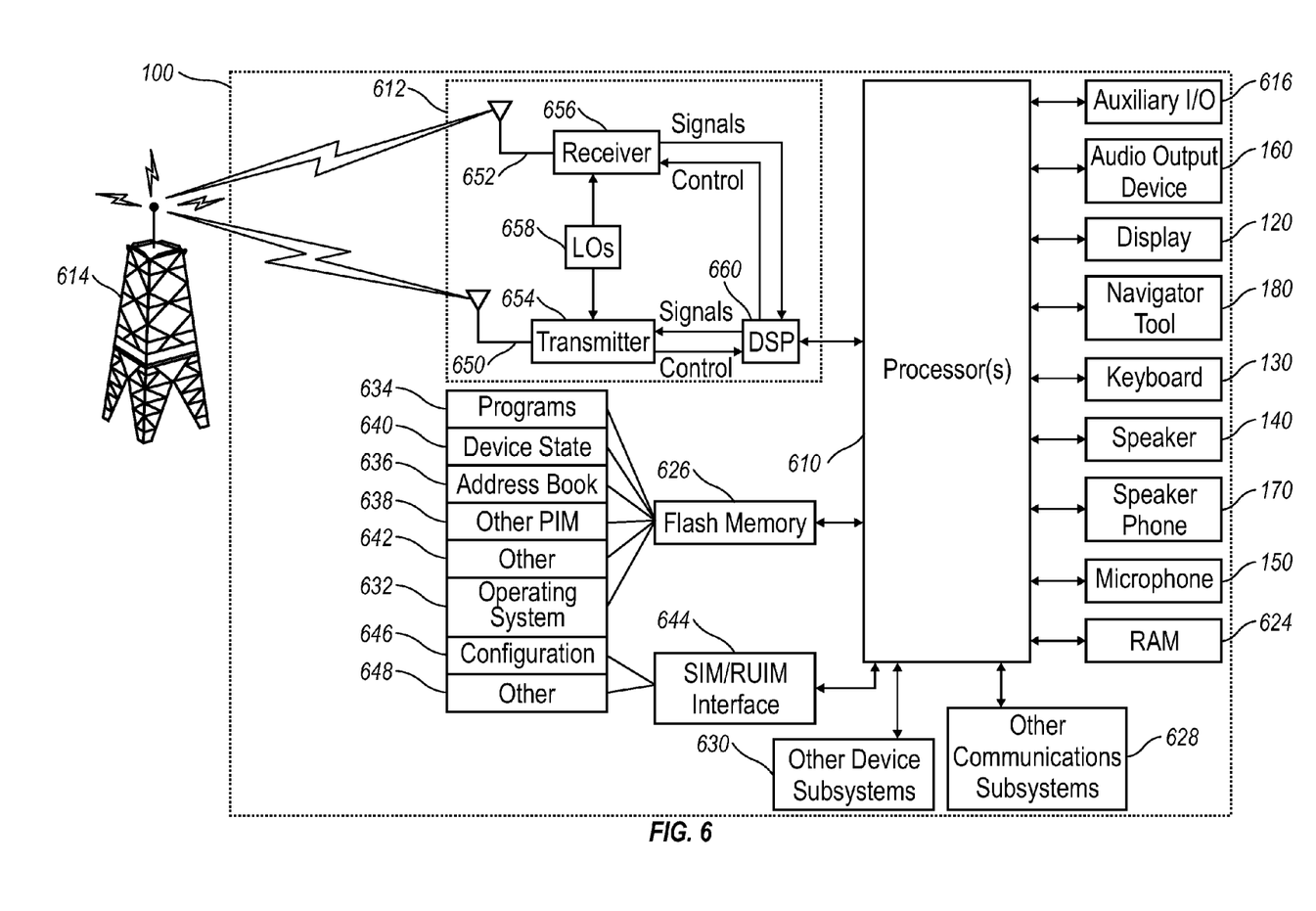
FIG. 6 is a block diagram representing a mobile communication device interacting in a communication network in accordance with an exemplary implementation of the present disclosure.

A mobile device 100, according to the present disclosure, can include components as illustrated in FIG. 6. While the components of FIG. 6 are not all inclusive, FIG. 6 illustrates components that can be included on a mobile device 100 according to the present disclosure. Additional components are required to allow the mobile device 100 to function, but have been omitted for clarity.

As illustrated in FIG. 6, the mobile device 100 includes a communication subsystem 611 to perform all communication transmission and reception with a wireless network 619. A processor module 610 can be connected with an auxiliary input/output (I/O) subsystem 616 which can be connected to the mobile device 100. The processor module 610 can include one or more processors. Additionally, the processors can be micro-processors for example. In at least one implementation, the processor module 610 can be connected to a serial port (for example, a Universal Serial Bus port) which can allow for communication with other devices or systems. The display 120 can be connected to the processor module 610 to allow for displaying of information to an user of the mobile device 100. When the mobile device 100 is equipped with a keyboard 130, the keyboard 130 can also be connected with the processor module 610. The mobile device 100 can include a speaker 140, a microphone 150, random access memory (RAM) 626, and flash memory 624, all of which can be connected to the processor module 610. Other similar components can be provided on the mobile device 100 as well and optionally connected to the processor module 610. Other communication subsystems 640 and other communication device subsystems 642 are generally indicated as being functionally connected with the processor module 610 as well. An example of the communication subsystem 640 is that of a short range communication system such as BLUETOOTH® communication module or a WI-FI® communication module (a communication module in compliance with IEEE 802.11 set of protocols) and associated circuits and components. The processor module 610 is able to perform operating system functions and enables execution of programs on the mobile device 100. In some implementations not all of the above components can be included in the mobile device 100.

The auxiliary I/O subsystem 616 can take the form of a trackpad navigation tool, or a trackball 180, a thumbwheel, a navigation pad, a joystick, touch-sensitive interface, or other I/O interface. While the above examples have been provided in relation to the auxiliary I/O subsystem 616, other subsystems capable of providing input or receiving output from the mobile device 100 are considered within the scope of this disclosure. Other keys can be placed along the side of the mobile device 100 to function as escape keys, volume control keys, scrolling keys, power switches, or user programmable keys, and can likewise be programmed accordingly.

Furthermore, the mobile device 100 is equipped with components to enable operation of various programs, as shown in FIG. 6. In an exemplary implementation, the flash memory 624 is enabled to provide a storage location for the operating system 657, device programs 658, and data. The operating system 657 is generally configured to manage other programs 658 that are also stored in memory 624 and executable on the processor. The operating system 357 honors requests for services made by programs 358 through predefined program 658 interfaces. More specifically, the operating system 657 typically determines the order in which multiple programs 658 are executed on the processor and the execution time allotted for each program 658, manages the sharing of memory 624 among multiple programs 658, handles input and output to and from other device subsystems 642, and so on. In addition, users can typically interact directly with the operating system 657 through a user interface which can include the keyboard 130 and display screen 120. While in an exemplary implementation the operating system 657 is stored in flash memory 624, the operating system 657 in other implementations is stored in read-only memory (ROM) or similar storage element (not shown). As those skilled in the art will appreciate, the operating system 657, device program 658 or parts thereof can be loaded in RAM 626 or other volatile memory.

In one exemplary implementation, the flash memory 624 contains programs 658 for execution on the mobile device 100 including an address book 652, a personal information manager (PIM) 654, and the device state 650. Furthermore, programs 658 and other information 656 including data can be segregated upon storage in the flash memory 624 of the mobile device 100.

When the mobile device 100 is enabled for two-way communication within the wireless communication network 619, the mobile device 100 can send and receive messages from a mobile communication service. Examples of communication systems enabled for two-way communication include, but are not limited to, the General Packet Radio Service (GPRS) network, the Universal Mobile Telecommunication Service (UMTS) network, the Enhanced Data for Global Evolution (EDGE) network, the Code Division Multiple Access (CDMA) network, High-Speed Packet Access (HSPA) networks, Universal Mobile Telecommunication Service Time Division Duplexing (UMTS-TDD), Ultra Mobile Broadband (UMB) networks, Worldwide Interoperability for Microwave Access (WiMAX), and other networks that can be used for data and voice, or just data or voice. For the systems listed above, the communication device 100 can require a unique identifier to enable the communication device 100 to transmit and receive messages from the communication network 619. Other systems may not require such identifying information. GPRS, UMTS, and EDGE use a Subscriber Identity Module (SIM) in order to allow communication with the communication network 619. Likewise, most CDMA systems use a Removable User Identity Module (RUIM) in order to communicate with the CDMA network. The RUIM and SIM card can be used in multiple different mobile devices 100. The mobile device 100 can be able to operate some features without a SIM/RUIM card, but the mobile device will not be able to communicate with the network 619. A SIM/RUIM interface 344 located within the mobile device 100 allows for removal or insertion of a SIM/RUIM card (not shown). The SIM/RUIM card features memory and holds key configurations 651, and other information 653 such as identification and subscriber related information. With a properly enabled mobile device 100, two-way communication between the mobile device 100 and communication network 619 is possible.

If the mobile device 100 is enabled as described above or the communication network 619 does not require such enablement, the two-way communication enabled mobile device 100 is able to both transmit and receive information from the communication network 619. The transfer of communication can be from the mobile device 100 or to the mobile device 100. In order to communicate with the communication network 619, the mobile device 100 in the presently described exemplary implementation is equipped with an integral or internal antenna 618 for transmitting messages to the communication network 619. Likewise the mobile device 100 in the presently described exemplary implementation is equipped with another antenna 616 for receiving communication from the communication network 619. These antennae (616, 618) in another exemplary implementation are combined into a single antenna (not shown). As one skilled in the art would appreciate, the antenna or antennae (616, 618) in another implementation are externally mounted on the mobile device 100.

When equipped for two-way communication, the mobile device 100 features the communication subsystem 611. As is understood in the art, the communication subsystem 611 is modified so that the subsystem 611 can support the operational needs of the mobile device 100. The subsystem 611 includes a transmitter 614 and receiver 612 including the associated antenna or antennae (616, 618) as described above, local oscillators (LOs) 613, and a processing module which in the presently described exemplary implementation is a digital signal processor (DSP) 320.

The present disclosure contemplates that communication by the mobile device 100 with the wireless network 619 can be any type of communication that both the wireless network 619 and mobile device 100 are enabled to transmit, receive and process. In general, these can be classified as voice and data. Voice communication generally refers to communication in which messages for audible sounds are transmitted by the mobile device 100 through the communication network 619. Data generally refers to all other types of communication that the mobile device 100 is capable of performing within the constraints of the wireless network 619.

Example device programs that can depend on such data include email, contacts and calendars. For each such program, synchronization with home-based versions of the programs can be desirable for either or both of their long term and short term utility. As an example, emails are often time sensitive, so substantially real time synchronization can be desired. Contacts, on the other hand, can be usually updated less frequently without inconvenience. Therefore, the utility of the mobile device 100 is enhanced when connectable within a communication system, and when connectable on a wireless basis in the network 619 in which voice, text messaging, and other data transfer are accommodated.

Exemplary implementations have been described hereinabove regarding system and method for resuming media playback on a mobile device. Various modifications to and departures from the disclosed implementations will occur to those having skill in the art. The subject matter that is intended to be within the spirit of this disclosure is set forth in the following claims.

What is claimed is:

1. A method of resuming playback of media following an interrupt request on a mobile device, the method comprising:
 identifying, via a processor, a pre-interrupt audio device assigned to output audio associated with the media;
 detecting the interrupt request;
 pausing the media in response to the interrupt request;
 detecting termination of the interrupt request;
 determining whether a post-interrupt audio device, assigned to output the audio associated with the media, matches the pre-interrupt audio device;
 resuming play of the media upon determination of the match; and
 denying resumption of playback of the media upon determination of no match.

2. The method as recited in claim 1, wherein the post-interrupt audio device is one of a stereo headset and a wireless headset and the method further comprises:
 determining whether the post-interrupt audio device is communicatively coupled to the mobile device; and
 denying resuming playback of the media upon determination that the post-interrupt audio device is not communicatively coupled to the mobile device.

3. The method as recited in claim 1, wherein the interrupt request is triggered by an incoming call to the mobile device.

4. The method as recited in claim 3, wherein pausing the media occurs automatically in response to the mobile device receiving the call.

5. The method as recited in claim 3, wherein detecting termination of the interrupt request is triggered by terminating the call.

6. The method as recited in claim 1, wherein the interrupt request is triggered by a user-selected option.

7. The method as recited in claim 1, wherein detecting termination of the interrupt request is triggered by bringing the media to a foreground of a display screen of the mobile device.

8. The method as recited in claim 1, wherein the media is one of an audio track or a video track.

9. The method as recited in claim 1, wherein the interrupt request is triggered by selecting a camera application.

10. A non-transitory memory having stored thereon a media application configured to control media play, including resuming playback of media following an interrupt request on a communication device, the media application when executed on the communication device causing the communication device to:
 identify a pre-interrupt audio device assigned to output audio associated with the media;
 receive the interrupt request;
 pause the media in response to the interrupt request;
 detect termination of the interrupt request;
 determine whether a post-interrupt audio device, assigned to output the audio associated with the media, matches the pre-interrupt audio device;
 resume play of the media upon determination of the match; and
 deny resuming playback of the media upon determination of no match.

11. The non-transitory memory as recited in claim 10, wherein the media application causes the communication device to trigger the interrupt request upon receiving an incoming call.

12. The non-transitory memory as recited in claim 10, wherein the media application causes the communication device to trigger the interrupt request based on a user-selected option.

13. The non-transitory memory as recited in claim 10, wherein the media application causes the communication device to trigger the interrupt request upon selection of a camera application.

14. The non-transitory memory as recited in claim 10, wherein the media application causes the communication device to detect termination of the interrupt request based on detecting termination of the call.

15. A communication device programmed to resume playback of media following an interrupt request, the communication device comprising:
- an audio port for communicatively coupling with an audio device; and
- a microprocessor communicatively coupled to the audio port, the microprocessor controlling operation of a media application to:
  - identify a pre-interrupt audio device assigned to output audio associated with the media;
  - receive the interrupt request;
  - pause the media in response to the interrupt request;
  - detect termination of the interrupt request;
  - determine whether a post-interrupt audio device, assigned to output the audio associated with the media, matches the pre-interrupt audio device;
  - resume play of the media upon determination of the match; and
  - deny resumption of playback of the media upon determination of no match.

16. The communication device as recited in claim 15, wherein the post-interrupt audio device is one of a stereo headset and a wireless headset and wherein the microprocessor is further configured to control operation of a media application to:
- determine whether the post-interrupt audio device is communicatively coupled to the communication device; and
- deny resumption of playback of the media upon determination that the post-interrupt audio device is not communicatively coupled to the mobile device.

17. The communication device as recited in claim 15, wherein the interrupt request is triggered by a user-selected option.

18. The communication device as recited in claim 15, wherein the interrupt request is triggered by an incoming call to the communication device.

19. The communication device as recited in claim 15, wherein the media is one of an audio track or a video track.

20. The communication device as recited in claim 15, wherein the audio port is a wireless transmitter.

* * * * *